United States Patent [19]

Soleimani et al.

[11] Patent Number: 5,208,829
[45] Date of Patent: May 4, 1993

[54] COMMUNICATION SATELLITE SYSTEM HAVING AN INCREASED POWER OUTPUT DENSITY PER UNIT OF BANDWIDTH

[75] Inventors: Mohammad Soleimani, Silver Spring; Sasan Rostami, Gaithersburg, both of Md.

[73] Assignee: Hughes Aircraft Company, Los Angeles, Calif.

[21] Appl. No.: 674,746

[22] Filed: Mar. 26, 1991

[51] Int. Cl.$^5$ .................................................. H04K 1/00
[52] U.S. Cl. ........................................... 375/1; 380/34; 455/12.1
[58] Field of Search ............ 375/1, 103; 380/34; 455/63, 12, 13, 12.1, 13.1

[56] References Cited

U.S. PATENT DOCUMENTS

| | | | |
|---|---|---|---|
| 4,455,651 | 6/1984 | Baran | 375/1 X |
| 4,860,317 | 8/1989 | Tomlinson | 455/12 X |
| 4,879,726 | 11/1989 | Kobayashi et al. | 375/1 |
| 4,901,307 | 2/1990 | Gilhousen et al. | 375/1 X |
| 4,972,430 | 11/1990 | Cantwell | 380/34 X |

FOREIGN PATENT DOCUMENTS

0151236  6/1988  Japan .......................... 375/1

*Primary Examiner*—Tod R. Swann
*Attorney, Agent, or Firm*—Gordon R. Lindeen, III; Wanda K. Denson-Low

[57] ABSTRACT

A satellite communication system for providing maximum power output in a spread spectrum signal transmission is disclosed. Spectral shaping is provided at a satellite transmitter to shape a spread spectrum so that over a bandwidth of interest, the spectrum has a maximally flat characteristic. By maximizing the spectrum amplitude flatness, the required power density for a bandwidth limitation imposed to prevent interference with other communication facilities is maintained. In each earth station receiving the transmission from the satellite, a filtering is provided of the demodulated baseband satellite signal such that the spectrum is restored to its original shape. The filters on the receive side may be analog, having the same amplitude function as the transmit spectrum shaping filter, but having an inverse phase response. This insures a matched filter condition at transmitter and receiver, maximizing signal transfer. A programmable demodulator is provided to select a demodulation mode. The programmable demodulator may receive microcode from a microprocessor configuring the PLA into a despreader, demodulator for spread spectrum applications or as a straight BPSK demodulator where the data signal has not been subject to spectrum spreading.

15 Claims, 6 Drawing Sheets

FIG_1

FIG_2

FIG_3

FIG_4

FIR FILTER FUNCTIONAL BLOCK DIAGRAM

FIG_5

COMMUNICATION SATELLITE SYSTEM HAVING AN INCREASED POWER OUTPUT DENSITY PER UNIT OF BANDWIDTH

The present invention relates to communication links between earth stations which communicate via satellites using spread spectrum modulated signals. Specifically, a system is provided for maximizing power output for a given bandwidth, and which is adaptable for use for data transmissions which are either transmitted in a spread spectrum format, or in an unspread format.

In fully using the potential of communication satellites, spread spectrum transmissions have been proposed in order to increase the total power output while maintaining the transmitted power output for a given frequency bandwidth within regulatory limits. The Federal Communications Commission has imposed regulatory limits on the power output of communication satellites so as to avoid any potential interference with other communication systems. By use of the spread spectrum technique, it is possible to increase the effective signal power received by an earth station antenna, while conforming to regulatory power limitations. Hence, earth stations having a smaller diameter antenna may be used without loss in performance. For instance, small aperture antennas of less than 1 meter diameter have become practical when the power output from the satellite is maximized using such spread spectrum techniques, observing the regulatory power limitation per unit of bandwidth.

The foregoing type of system has been described in U.S. Pat. No. 3,617,892. Spread spectrum techniques are also used in terrestrial communication systems as is described in U.S. Pat. No. 4,901,307. The present invention is directed at an effort to continue with this technology of maximizing the power output from a satellite so that very small antenna apertures may be used for earth stations.

Spread spectrum systems also reduce the effect of the satellite or earth station transmission on other systems as a result of the power limitation per unit of bandwidth. In achieving each of these objectives, the spreading of the modulated data signal is done so as to achieve a power density of 6 dBW per 4 KHz of transmission bandwidth. This limitation has been set forth by the FCC as sufficient to avoid interference between other transmission systems.

SUMMARY OF THE INVENTION

It is an object of this invention to provide increased utilization of satellite signal transmission power while maintaining power density within regulatory limits.

It is yet another object of this invention to provide a receiving system for a VSAT network which is capable of demodulating spread spectrum transmissions, as well as transmissions which are not spectrum spread.

These and other objects of the invention are provided by a communication satellite system which employs spectrum shaping of the spread spectrum signal at the earth station transmitter so as to maximize the power output of the receiving satellite while conforming to the required limit of power output density. In shaping the spectrum, a filter is employed for filtering a spread spectrum signal containing data for transmission to a distant earth station via the satellite, so that over the bandwidth of interest, a maximally flat amplitude versus frequency function is derived. The transmitted signal amplitude versus frequency is typically defined by the function $$\frac{\text{SIN} X}{X},$$

where X is frequency. The output signal power density decreases with increases in frequency. A filter is provided having an amplitude-frequency characteristic which is over the bandwidth of interest, substantially the reciprocal, i.e., $$\frac{X}{\text{SIN} X}$$

of the spread spectrum amplitude function. By employing such filtering the signal is amplitude-normalized over the particular frequency band of interest. The spectrum shaped signal is then transmitted to a satellite where it is frequency shifted, yet retains essentially the same spectrum shape. Thus, over the transmit bandwidth all frequency components have an amplitude along the upper limit of 6 dbW per 4 KHz of bandwidth, maximizing the transmission output of the satellite while maintaining the best possible interference margins.

To derive the benefits of spectrum shaping at the transmitter, similar signal processing is done at the receiving earth station, which processes the rebroadcast signal. At the earth station receiver, the down converted spread spectrum signal is divided into I and Q orthogonal signals. The I and Q orthogonal signals are filtered with a Butterworth (maximally flat) filter. The spectrum shaping filter at the transmitter is selected to be the inverse time function of the receiver filter. On the receive side, these filters may be analog filters having a 6 pole Butterworth response over the bandwidth of interest. On the transmit side, the spectrum shaping filter is an FIR filter having the aforesaid 6 pole Butterworth configuration having an impulse response time inverse to the receive side processing filters.

By employing the matched filters on each side of the communication link it is possible to derive an optimum matched response while maximizing power density and minimizing adjacent channel interference.

As another feature of the invention, a digital processor controlled demodulator is employed. A microprocessor may program a programmable logic array (PLA) to provide a despreading of the spectrum, or alternatively, provide programming to the PLA for demodulating a signal which is not spectrum spread, such as standard BPSK through conventional demodulation techniques. The microprocessor-driven PLA may, at the user's option, load either one of two sets of control data to the PLA to establish the firmware for a particular demodulator implementation.

DESCRIPTION OF THE PREFERRED EMBODIMENT

Figure 1:
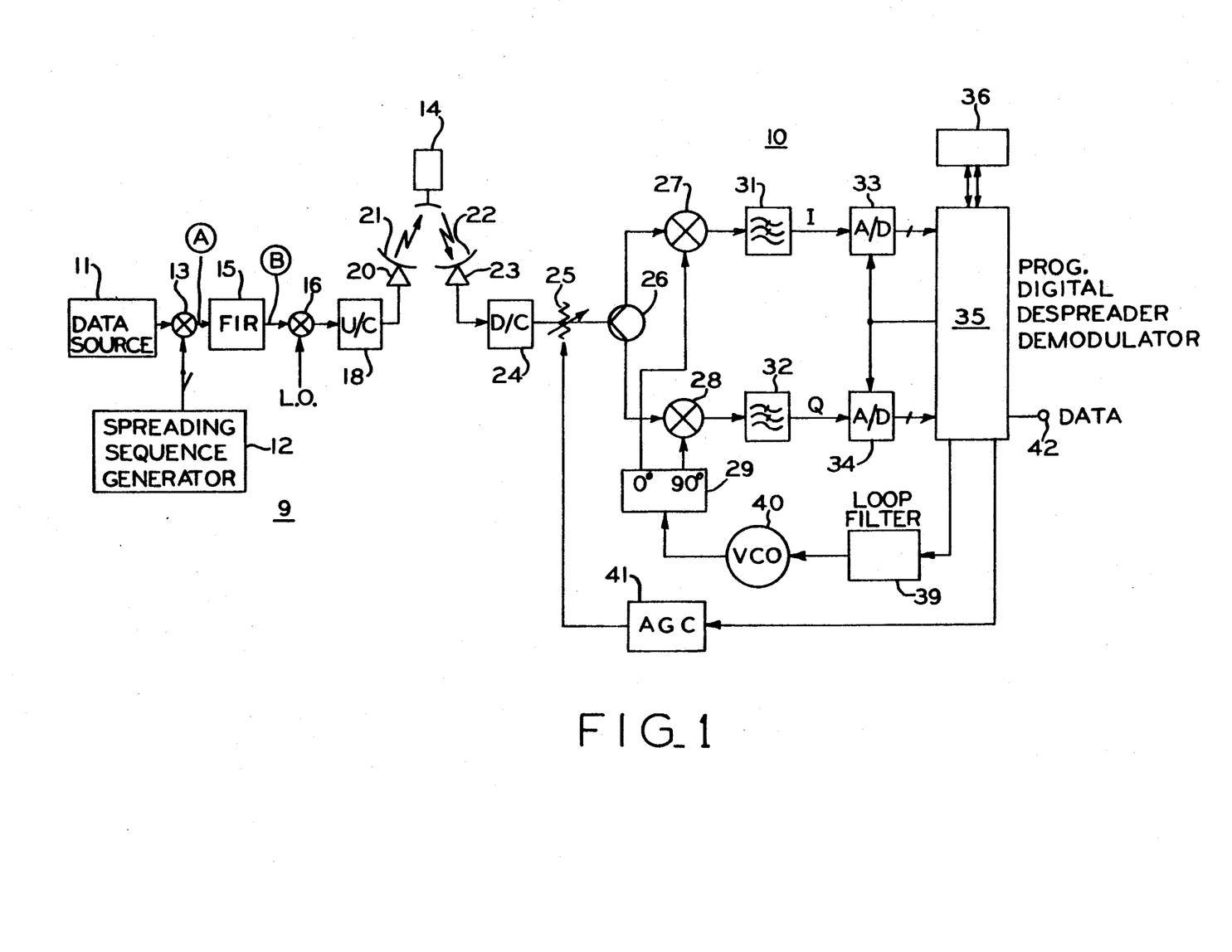
FIG. 1 is a block diagram of the satellite communication system in accordance with a preferred embodiment, employing spectrum shaping at the earth station transmitter, with matched filtering at the earth station receiver.

Referring now to FIG. 1, there is shown a block diagram illustrating an example of a satellite communication system in accordance with the preferred embodiment. This system includes an earth station transmitter 9 as well as an earth station receiver 10 communicating via a satellite 14. The transmitter 9 includes a source of data 11, which data is broadcast as a spread spectrum signal modulated on an RF carrier signal. The spreading of the data spectrum is accomplished through what is generally shown as an exclusive OR circuit 13 receiving as a second input a spreading sequence signal from sequence generator 12, having a chip rate f(c) which is a multiple of the data bit rate. A unique sequence is employed which is synchronized to the data bit stream and repeated at the end of the sequence. By employing the exclusive OR function, the bandwidth of the data signal is increased to the bandwidth of the spread signal. The resulting signal is modulated on a local oscillator subcarrier by means of a modulator 16. In many satellite communication systems, this modulation is accomplished through BPSK modulation, i.e., binary phase shift keying modulation. The modulated subcarrier signal containing the spread spectrum signal is frequency up converted to the final transmit carrier frequency by an up converter 18. A power amplifier 20 and antenna 21 are used to transmit the modulated carrier signal bearing the spread spectrum signal to an earth station receiver 10 via satellite 14. Satellite 14 frequency shifts the modulated carrier signal to a down link frequency signal. The down link signal is broadcast to the receiver of earth station 10.

In carrying out the present embodiment of the invention, spectrum shaping is employed by the use of an FIR filter 15. The FIR filter has a lowpass filter structure for tailoring the spectrum of the spread signal. The bandwidth of the filter corresponds to substantially one half of the chip rate f(c). The amplitude response of the filter is shaped to be maximally flat, with less than 1 db of ripple. This permits the power level to be maximized to the 6 dbW/4 KHz limitation, per the FCC imposed limit.

Figure 2:
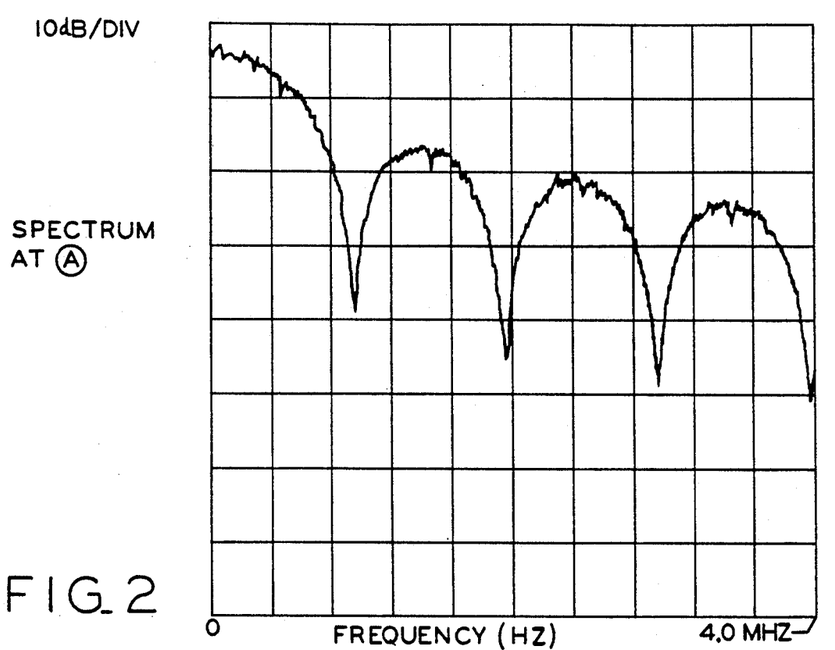
FIG. 2 is an amplitude frequency response of the spread spectrum signal produced by spreading the data signal.
Figure 3:
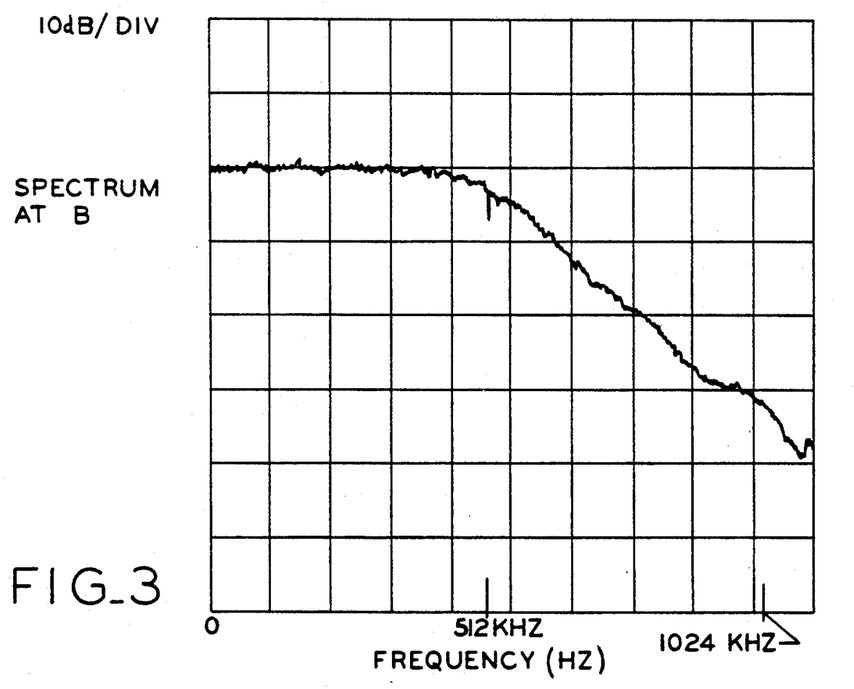
FIG. 3 illustrates how spectrum shaping can maximize the power output density over the bandwidth of interest.

The filtering provided by the FIR 15 can be explained in terms of the spread spectrum plots shown in FIG. 2, and the filtered response shown in FIG. 3. Referring to FIGS. 2 and 3, it is clear that the spread spectrum is of the form of $$\frac{SINX}{X}$$

where X is frequency. It should be recognized that each of FIGS. 2 and 3 represent half of the transmit spectrum, once the carrier signal is modulated, the other half being a mirror image to the left of the Figures.

The required bandwidth of interest is the chip rate f(c), or spreading frequency, which for the present example, is 1024 kilochips/second. Thus, since each of the foregoing illustrations represent half of the bandwidth of interest, the 512 KHz mark represents the practical 3 db point for the bandwidth of interest. As can be seen from FIG. 3, the amplitude function has a minimum ripple in this area, as contrasted to the $$\frac{SINX}{X}$$

function before filtering as shown in FIG. 2.

The spectrum shown in FIG. 3 may be amplified such that any frequency components within the bandwidth of interest are at the maximum power density permitted by FCC regulations.

In order to achieve the spectrum shaping of FIG. 3, the FIR filter is selected to be a 6-pole Butterworth filter, having an impulse response time inverse to a corresonding receive filter impulse response.

Figure 4:
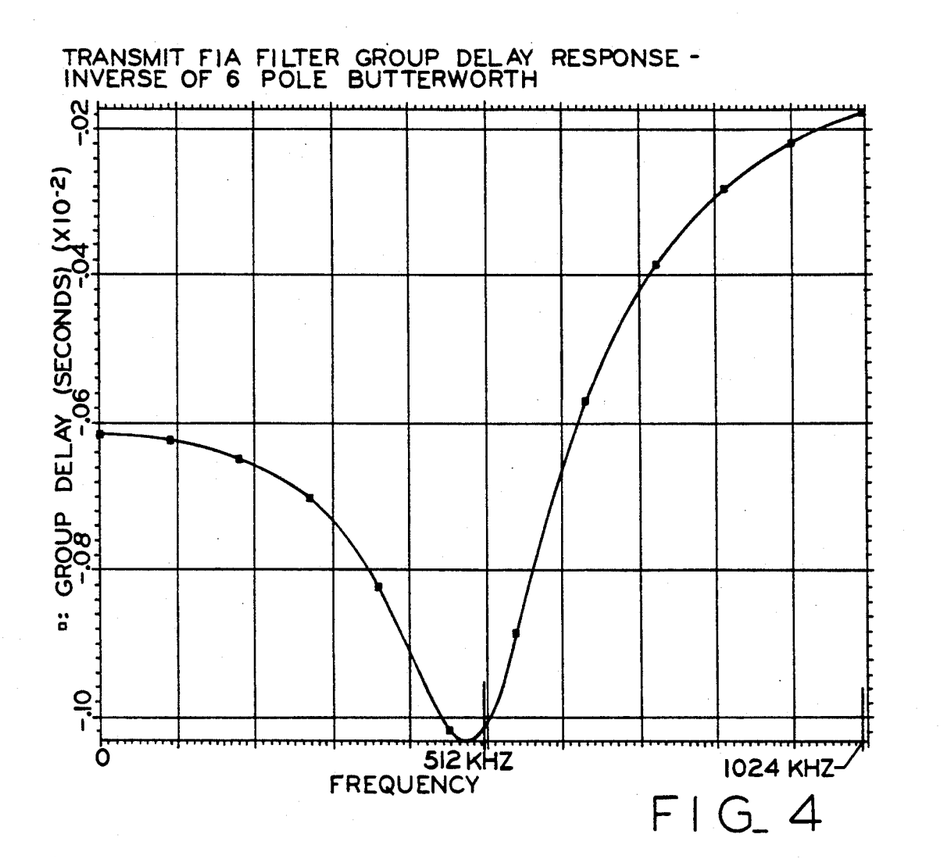
FIG. 4 illustrates the group delay response of an inverse 6-pole Butterworth filter characteristic for obtaining the spectrum shaping of FIG. 3.
Figure 5:
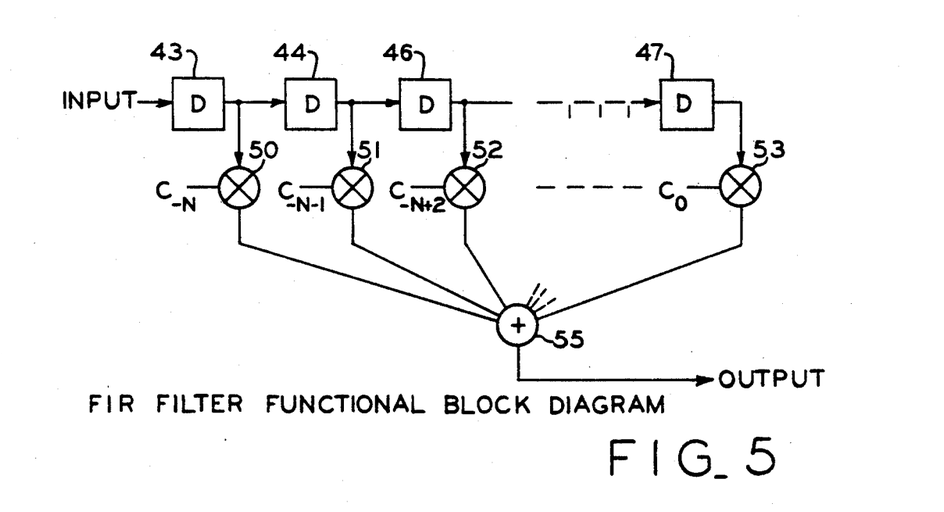
FIG. 5 is a block diagram of an FIR filter which may be employed to shape the spectrum of the spread spectrum earth station transmission signal.

To approx the time inverse 6-pole Butterworth filter, an FIR filter which is shown in block diagram form in FIG. 5 may be implemented. This block diagram provides for a plurality of delay elements 43 through 47, producing signals summed together after weighting by coefficients C by summing networks 50 through 53. The weighting coefficients for obtaining the filter functions of the previous FIGS. 3 and 4 may be selected from well-known filter design references. The weighted outputs from each of the delay elements 43–47 are combined in a final summation network illustrated as 55.

It will be recognized that the inverse 6-pole Butterworth filter may be configured in the conventional FIR filter structure of FIG. 1 by implementing in ROM the required coefficients. The resulting digital signal from the ROM may then be converted from a digital signal to an analog signal prior to applying the signal to BPSK modulator 16.

Having thus described a transmitter having a power spectrum shaped to provide the maximum power over the bandwidth of interest while maintaining the required power density limit, a receive station 10 for the spectrum-shaped signal may be described.

The earth station 10 receiver of FIG. 1 includes a small aperture directional antenna 22 for receiving the spread spectrum signal transmitted on the satellite carrier. The first low noise amplification stage 23 provides the carrier signal to a down converter 24. The down converter 24 converts the spread spectrum carrier signal to an intermediate frequency signal bearing the spread spectrum modulated data.

An attenuator 25 is shown as part of an AGC loop controlled by an AGC amplifier 41. The resulting intermediate frequency signal is split by power splitter 26 and applied to a pair of mixers 27 and 28. The mixers 27 and 28 are supplied with conventional orthogonal reference signals so as to provide conventional I and Q baseband signals. The I and Q baseband signals are filtered in a pair of low pass filters 31 and 32.

These filters may be analog filters which are inexpensive and which exhibit a 6-pole Butterworth response having 3 db points at approximately the same bandwidth as the FIR filter 15 in the transmitter of the earth station 9.

Figure 7:
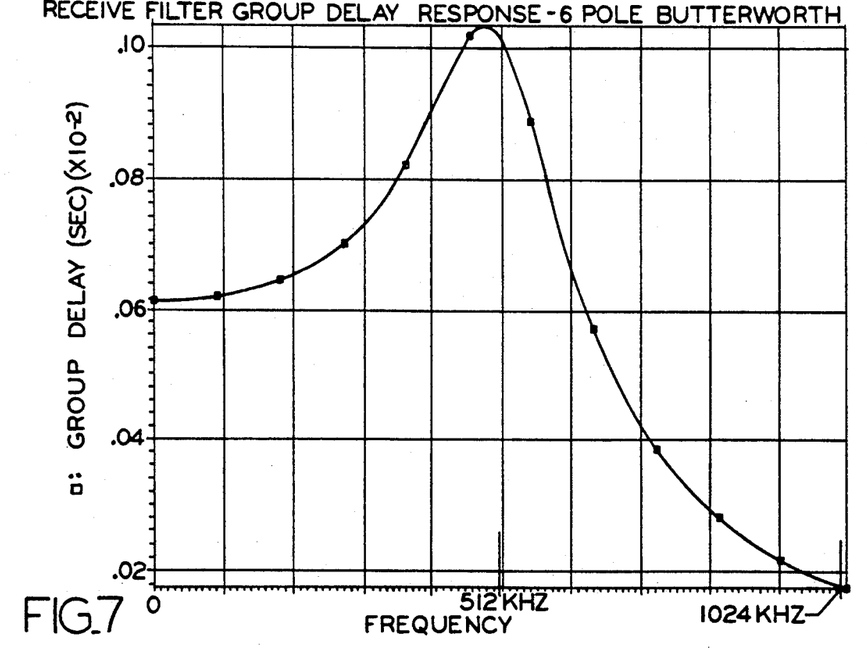
FIG. 7 shows the group delay response for the 6-pole Butterworth filter employed in the earth station receiver.
Figure 8:
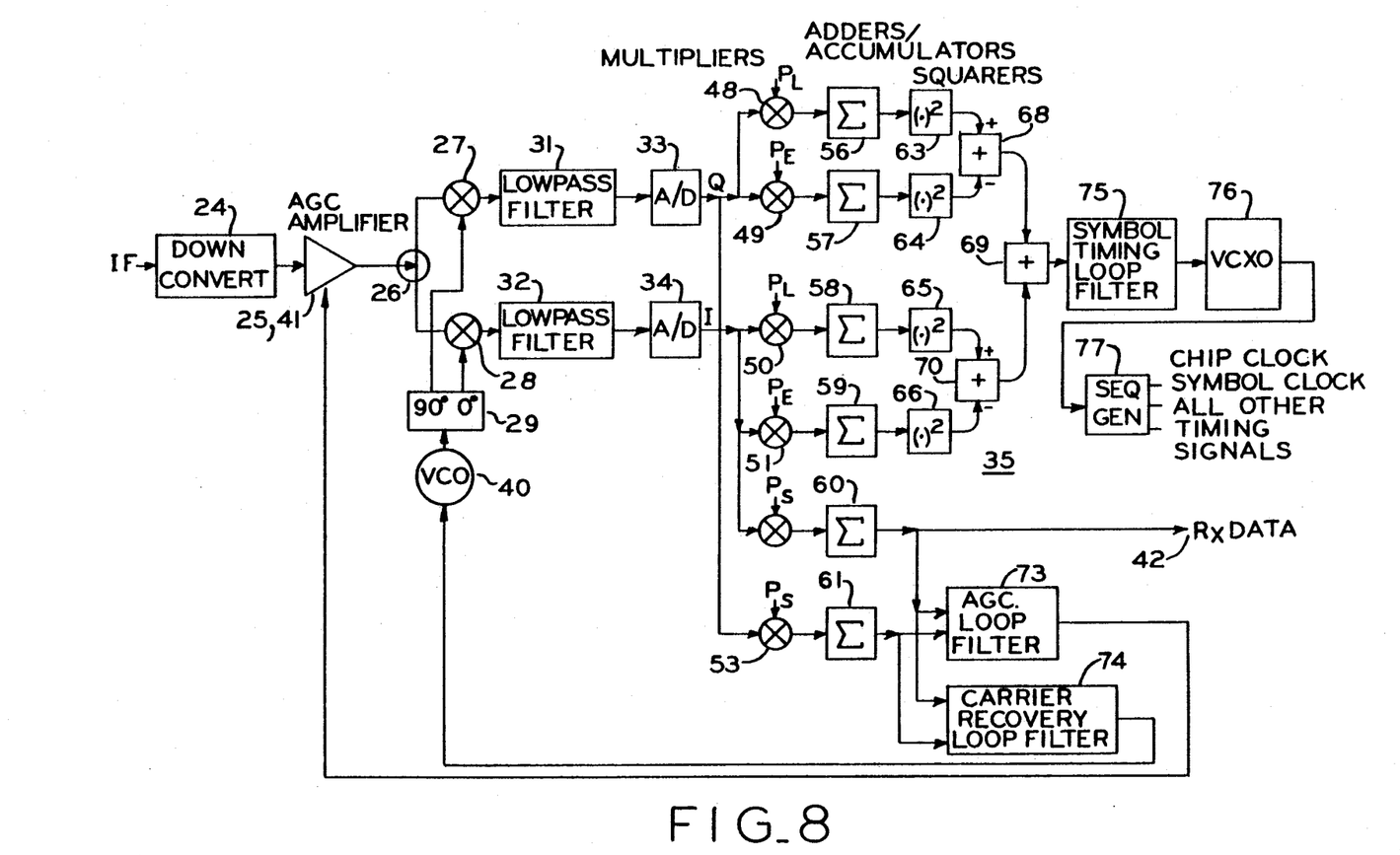
FIG. 8 illustrates in detail an earth station receiver employing a firmware configured spectrum despreading circuit.

The filters 31, 32 are constructed to have a group delay response as shown in FIG. 8. The group delay of the FIR filter 15 is inverse of the group delay for the analog receive filter of FIG. 8, as shown in FIG. 7. The filters on the transmit and receive side are matched filters having a combined response of S(T).H(T) to be approximately Nyquist, where S(T) is the FIR 15 filter transfer function and H(T) is the transfer function of filters 31, 32.

The matched filters 15 and 31, 32 provide for a maximum signal transfer. The filtered I and Q signals are then digitized in analog to digital converters 33 and 34. A programmable digital despreader 35 is provided which, under control of the microprocessor 36, is configured to provide despreading and demodulation of the signal, providing the demodulated data signal on output terminal 42.

The programmable digital despreader 35 receives microcode from the microprocessor 36 for configuring the programmable logic array to provide the demodulation of FIG. 8. This will provide the loop filter 39 drive signals for controlling the VCO 40 of the baseband demodulator as well as an AGC signal for insuring a constant amplitude signal to the analog to digital converters 33, 34.

Figure 9:
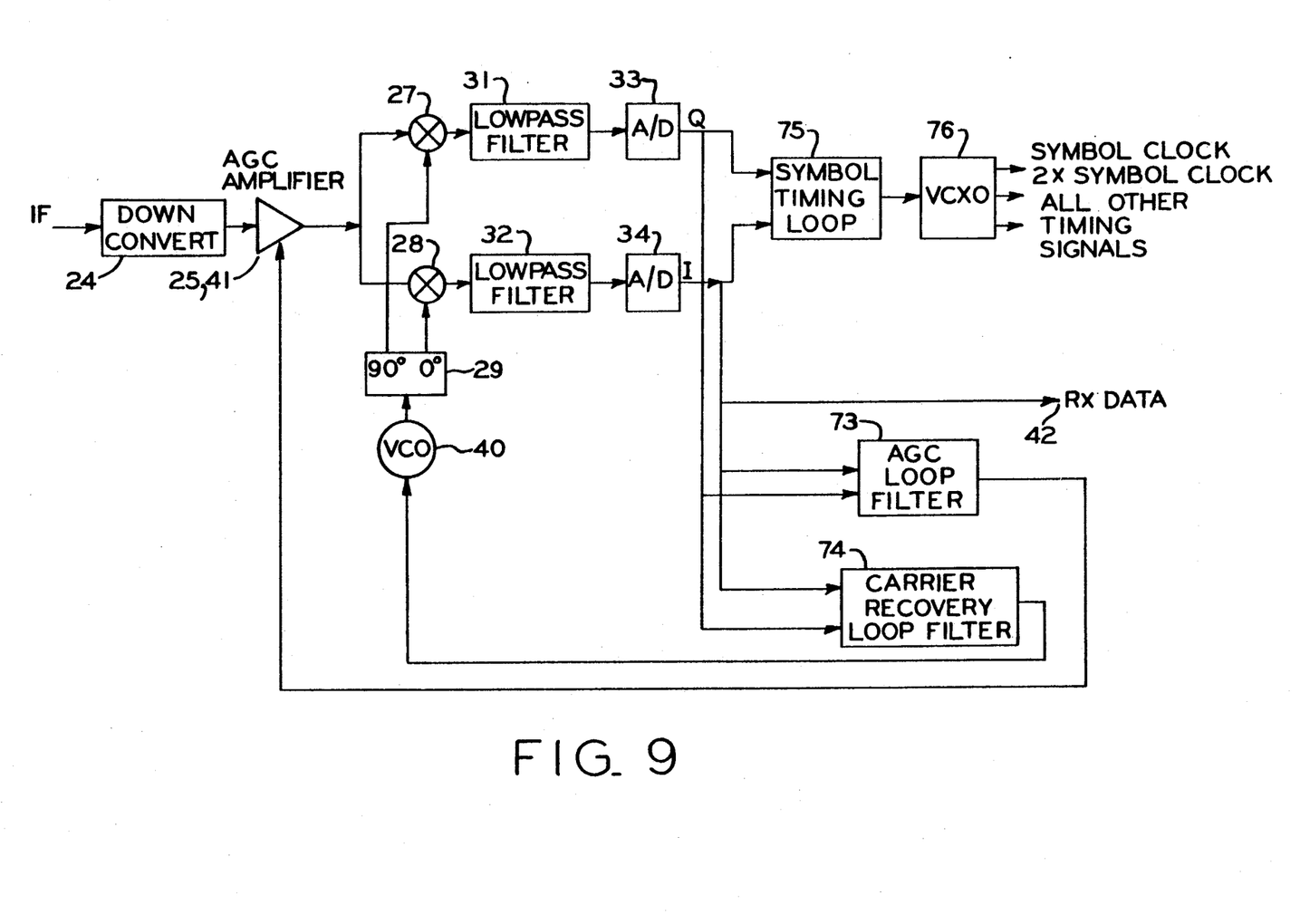
FIG. 9 is a block diagram of a firmware-configured standard BPSK demodulator which may be selected under control of the microprocessor in the earth station receiver.

In accordance with yet another feature of the invention, the programmable despreader demodulator 35 is configured from the programmable logic array to either provide the despreading demodulator shown in FIG. 8, or to provide a demodulator which will demodulate signals which have not been spread, as shown in FIG. 9. The programmability of the programmable logic array from the microprocessor 36 provides an earth station capable of being rapidly configured under control of microprocessor 36 for either demodulator type.

FIG. 8 is a block diagram showing the programmable logic array 35 as it is configured from the microcode downloaded from the microprocessor. The aforesaid programmable logic array is configured to provide the standard despreader demodulation circuitry shown. This includes a plurality of multipliers 48 through 53, fed by three sequence signals PL, PE and PS. As is known in the spread spectrum technology, three sequence signals representing a synchronous sequence PS, an early sequence PE and a late sequence PL, are generated from sequence generator 77. These signals represent the spreading sequence used at the transmitter for spreading the data signal over the spectrum by the 1054 kilochip/second signal. The results of multiplying the sequence signals PL, PE and PS with the I and Q signals are accumulated in adders/accumulators 56–59. Squaring circuits 63–66 square the output signals of these adders/ accumulators. The squared outputs are then summed in summing circuits 68–70 to derive the error signal for despreading the I and Q signals.

The synchronous (on time) sequence is multiplied by the I and Q signals. The results are accumulated in adder-accumulators 60, 61 as control signals for the AGC and carrier recovery circuits. The carrier recovery loop filter 74 is driven from a signal from each of the adders-accumulators 60 and 61, thereby controlling the frequency of the baseband demodulator oscillator VCO 40.

The signal for controlling the chip clock and symbol clocks and the remaining timing signals for the CDMA demodulator is derived from the squaring function circuits 63 through 66 and summation circuits 68, 69 and 70. A symbol timing loop filter 75 filters the resulting signal for controlling the phase and frequency of the VCXO 76.

Figure 6:
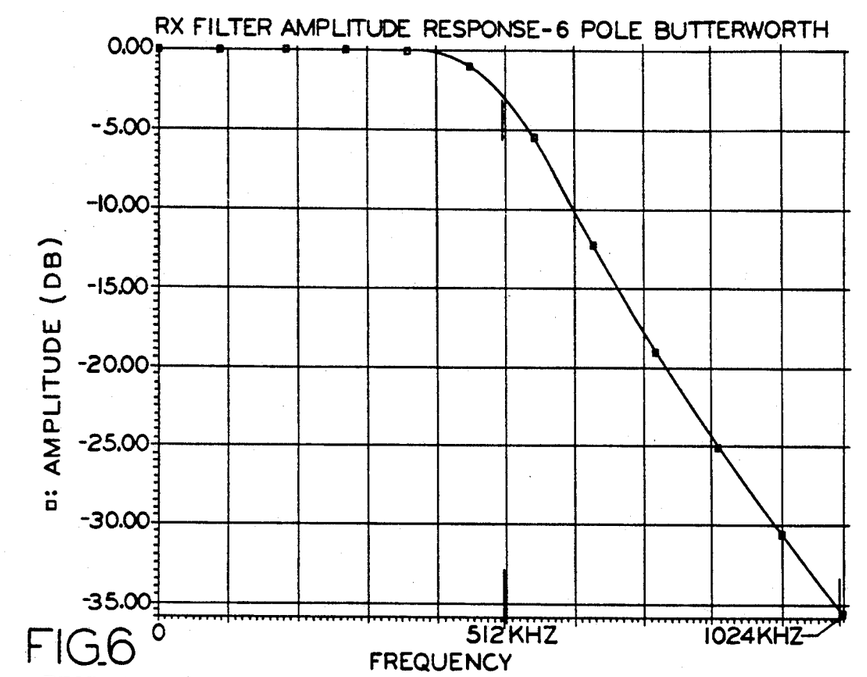
FIG. 6 shows the amplitude response of a 6-pole Butterworth filter for the receiver which is matched by the spectrum shaping filter implemented in the earth station transmitter.

By implementing the foregoing demodulator in a programmable logic array, as has been mentioned, it is possible to change the configuration of the demodulator from a despreading application such as provided with FIG. 6, to a non-spreading spectrum demodulator representing a conventional BPSK demodulator. Referring specifically to FIG. 9, there is shown a configuration for a BPSK modulator obtained by downloading the requisite firmware from the microprocessor to the PLA 35. In the configuration of FIG. 9, the PLA has been configured to produce as output data on terminal 42 the I channel representing a digitized baseband signal free from any carrier or intermediate frequency components. Additionally, a symbol timing loop 75 is maintained as well as the VCXO 76 for providing a symbol clock and other timing signals needed to further process the data on terminal 42. An AGC loop filter 73 and carrier recovery loop filter 74 as is conventional in these systems, operates from the I and Q signals to develop the respective control signals for the AGC amplifier 41 and voltage controlled oscillator 40.

Thus, as has been shown, the use of the programmable logic array, under control of the microprocessor, provides for the versatility of configuring different demodulator types with only minimal operator intervention, and no change in circuit hardware. Those skilled in the art will recognize yet other embodiments described more particularly by the claims which follow.

What we claim is:

1. An earth station transmitter for transmitting a spread spectrum modulated data signal to a satellite comprising:
   a source of data signals;
   a spreading sequence generator for generating a spreading signal at a spreading signal chip rate f(c) synchronized with said data signals;
   a multiplier for multiplying said data signals with said spreading signal to produce a spread spectrum signal having an amplitude versus frequency function defined by $$\frac{\sin X}{X},$$

where X is frequency;
   a filter having an amplitude versus frequency characteristic defined by a 6-pole Butterworth function and by X/SIN X for filtering said spread spectrum signal to thereby produce a filtered spread spectrum signal which is amplitude normalized over at least a portion of said spread spectrum signal bandwidth; and,
   a converter for frequency upconverting said filtered spread spectrum signal for transmission to the satellite.

2. The earth station transmitter of claim 1 wherein said filter comprises a digital FIR filter.

3. The earth station transmitter of claim 1 wherein said Butterworth function has a passband ripple of less than 1 db over said portion of said signal bandwidth.

4. The earth station transmtter of claim 2, wherein said filter is a lowpass filter having a 3 db bandwidth substantially one half of the spreading signal chip rate f(c).

5. A satellite earth station receiver system for receiving a spread spectrum modulated data signal spectrum shaped to have a maximally flat Butterworth filtered characteristic comprising:
  a down converter for frequency translating said modulated spread spectrum signal to an intermediate frequency signal;
  a baseband signal processor for dividing said intermediate frequency signal into I and Q phase quadrature signals;
  first and second filters for filtering respective of said I and Q signals, said filters having an impulse response time inverse to said Butterworth filtered characteristic; and,
  demodulator means connected to receive said I and Q signals demodulating data contained in said spread spectrum modulated data signal.

6. The satellite receiver of claim 5 wherein said demodulator means comprises:
  analog to digital converter means connected to digitize each of said I and Q signals; and,
  digital circuit means connected to receive digitized data signals from said analog to digital converter means, and provide therefrom a signal proportional to the data signal.

7. The satellite receiver of claim 6 wherein said baseband signal processing means comprises:
  a power divider connected to receive said intermediate frequency signal, and dividing said intermediate frequency signal into two signals;
  first and second mixers connected to receive said two signals; and,
  a voltage controlled oscillator means providing first and second reference signals having a phase quadrature relationship to said first and second mixers, whereby said first and second mixers produce first and second quadrature detected signals.

8. The satellite communication system of claim 7 wherein said FIR filter has an impulse response time inverse to said analog filter impulse response.

9. The satellite receiver of claim 5 wherein said demodulator means comprises:
  a programmable logic array, said array being programmable from first and second sets of configuration data to produce either a spread spectrum demodulator, or a non-spread spectrum demodulator; and,
  a microprocessor connected to said programmable logic array to supply programming data to said programmable logic array.

10. The satellite receiver of claim 7 wherein said programmable logic array supplies a control signal to said voltage controlled oscillator for maintaining said oscillator first and second reference signals in phase synchronism with said power divider signals.

11. The satellite communication system of claim 9 wherein said first and second filter means comprise first and second analog filters having an amplitude frequency response equal to said FIR filter amplitude frequency response.

12. A satellite communications system comprising:
  means for producing a spread spectrum signal from a data signal with a spreading signal having a chip rate f(c) and having an amplitude of $$\frac{\sin X}{X}$$

where X is a frequency;
  an FIR filter for producing from said spread spectrum signal a signal having a flat amplitude function over a substantial portion of said filter 3 db bandwidth which is substantially equal to one half of said spreading signal chip rate f(c);
  modulation means for modulating said signal having said substantially flat amplitude function on a carrier signal; and,
  antenna means for transmitting said carrier signal to a satellite, wherein it is rebroadcast on a different carrier signal; and,
  a receiver including a down converter for producing an intermediate frequency signal from said satellite rebroadcast carrier signal;
  a baseband demodulation means for removing said spread spectrum signal from said intermediate frequency signal, producing I and Q quadrature baseband signals;
  first and second filter means for filtering said I and Q signals, said filter means having an amplitude frequency response substantially identical to said FIR filter response; and,
  demodulator means for removing said data signal from said I and Q signals.

13. In a satellite communications system for transmitting and receiving a spread spectrum data signal which is filtered by an FIR filter to spectrally shape said spread spectrum data signal, a receiver comprising:
  a down converter for converting a carrier signal having said spread spectrum data signal modulated thereon to an intermediate frequency signal;
  a baseband demodulator means for removing said spread spectrum data signal from said intermediate frequency signal, and forming I and Q quadrature signals;
  first and second analog Butterworth filters for filtering said I and Q signals having an amplitude frequency response matched to said FIR filter which spectrally shapes said spread spectrum data signal; and,
  demodulation means for despreading said spread spectrum signal and producing therefrom said data signal.

14. The receiver of claim 13 wherein said demodulation means comprises:
  a microprocessor system for storing first and second sets of configuration data, one set of configuration data defining a despreading demodulator, the other set of data defining a demodulator for processing a data signal which is not spread; and,
  a programmable logic array for receiving one or the other of said sets of configuration data, said logic array providing first and second demodulators for demodulating either a spread spectrum data signal or a data signal which is not spread.

15. The receiver of claim 14, wherein said demodulator processing a data signal which is not spread is a binary phase shift key demodulator.

* * * * *